MOL. WT. OF POLYBUTADIENE VS. INTRINSIC VISCOSITY

United States Patent Office 3,835,075
Patented Sept. 10, 1974

3,835,075
BUTADIENE RESINS AND PROCESS FOR PREPARATION
Stephen P. Boutsicaris, Akron, and Robert A. Hayes, Cuyahoga Falls, Ohio, assignors to The Firestone Tire & Rubber Company, Akron, Ohio
Continuation of application Ser. No. 158,031, June 29, 1971, which is a continuation-in-part of application Ser. No. 121,589, Mar. 5, 1971, which is a continuation of application Ser. No. 818,971, Apr. 24, 1969, which in turn is a continuation-in-part of application Ser. No. 715,521, Mar. 25, 1968, all now abandoned. This application Apr. 26, 1973, Ser. No. 354,563
Int. Cl. C08c 11/10; C08d 3/08, 9/06
U.S. Cl. 260—17.4 BB
41 Claims

ABSTRACT OF THE DISCLOSURE

This invention involves a process for preparing hard, tough, heat-resistant plastics by the peroxide curing of butadiene polymers having a dilute solution viscosity of 0.19–0.7 and having a high vinyl content and a narrow molecular weight distribution, using a peroxide which gives free radicals of the structure $R_2(CH_3)CO\cdot$. Although the peroxide curing of butadiene polymers generally results in products having elastomeric properties and being swellable in benzene, the process of this invention permits very rapid curing without crazing or cracking to give rigid, heat-resistant polymers. The butadiene polymers have at least 40%, preferably at least 70% by weight butadiene therein, advantageously having at least 80% in the vinyl-type of repeating units, the average molecular weight being at least 12,500 with a molecular weight distribution such that at least 50% and preferably at least 90% is above 10,000 molecular weight and at least 95% is above 2,000. The proportion of peroxide used, preferably dicumyl peroxide, is 0.5–6, preferably 1–5 parts per 100 parts of polymer, and the curing temperature is at least 250° F. (120° C.), preferably 300–350° F. (150–180° C.). This process lends itself to liquid compounding for the incorporation of the peroxide and any modifiers, and for mixing with filler.

---

This application is a continuation of application Ser. No. 158,031, filed June 29, 1971; which is a continuation-in-part of application Ser. No. 121,589, filed Mar. 5, 1971; which is a continuation of application Ser. No. 818,971, filed Apr. 24, 1969; which is a continuation-in-part of application. Ser. No. 715,521, filed Mar. 25, 1968; all now abandoned.

BACKGROUND OF THE INVENTION

Field of the Invention

This invention relates to butadiene polymers, specifically those containing at least 80% by weight of butadiene pendent vinyl or 1,2 repeating units, and the process for converting such polymers to hard, rigid, heat-resistant resins by peroxide curing.

Related Prior Art

Van Der Hoff, Ind. Eng. Chem., Prod. Res. Devel., 2 (4), 273 (1963), describes the vulcanization of various polybutadienes. However, there is no indication in this publication that it is possible to produce rigid heat-resistant resins from the polybutadienes. Moreover, all of the products are indicated as being susceptible to swelling in benzene.

Van Der Hoff concludes that there is little difference in cross linking of polybutadiene via vinyl side groups as compared to the cis-1,4 groups. For example on Page 276, Columns 1 and 2, he states:

"Neither 32% 3,4-polyisoprene (FIG. 2) nor 64% 1,2-polybutadiene (FIG. 5) is particularly highly cross-linked. To established whether propagation preferentially proceeds via vinyl side groups, the infrared spectrum of vulcanizates produced from a 93% cis-1,4-polybutadiene which contained 3.5% 1,2 units was analyzed.

"In reactions with 0.5 part of peroxide no loss of vinyl side group content could be determined within experimental errior. Vulcanization by 2 parts of peroxide per 100 parts of polymer resulted in a tight vulcanizate with 30% less unsaturation than the original polymer. In this case about 60% of the vinyl side group and about 30% of the main chain unsaturation had disappeared. . . . *That the difference in reactivity between these two types of double bonds is relatively small may be due to the diffusion control of the propagation rate. . . . This view is compatible with the observed weak influence of microstructure on the propagation reaction. . . .*" (Italics supplied.)

Obviously therefore the author placed little importance on the microstructure of the polymers as influencing the crosslinking or propagation rate. Moreover, in the only two butadiene polymers having a substantial vinyl or 1,2-configuration, namely Polymers 12 and 13 of Table III, the intrinsic viscosities of 1.0 and 1.8 indicate that the molecular weights are too high for good processability. For good processability average molecular weights of 55,000 or less are preferred, which corresponds to intrinsic viscosities of 0.68 or less at 30° C., or 0.7 or less at 25° C. With average molecular weights of 90,000 or 100,000 there is poor flow of polymer in molding operations.

Another author (Whitby: "Synthetic Rubber" Pages 18–20, Wiley Publishing Co., New York, 1954) states: "When polymers are vulcanized in order to unite the primary polymer chains into a network, the physical properties of the network depend on both the length of the primary chains and the number of cross-links between them; the longer the primary chains, the fewer the cross-links needed to produce a network possessing given physical properties, . . ." However, as previously indicated the length of the primary chains is limited accordinng to molecular weights which will give good processability and good flow during molding. Therefore it requires more than a selection of molecular weight to obtain the proper combination of fast cure and hard, non-swellable products.

For example, applicants have attempted, contrary to Van Der Hoff's statements discounting the importance of pendent vinyl or 1,2- configuration in butadiene polymer repeating units, to select a prior art butadiene polymer prepared in a manner that produces a high proportion of pendent vinyl groups such as the sodium polymerization taught by Example 1 of the Gleason et al. U.S. Pat. No. 2,772,254 and have applied the teaching of Whitby by extracting the low molecular weight portion to an extent of about 12.5% of the total weight of polymer. As shown hereinafter in Example A, the mere removal of the low molecular weight portion did not result in a fast curing, hard, non-swellable product.

The present inventors have found that the desired processability, curing results and properties can be obtained by a proper combination of average molecular weight, molecular weight distribution and pendent vinyl content together with appropriate curing catalyst and curing temperature.

STATEMENT OF THE INVENTION

This invention comprises the process of peroxide curing a butadiene polymer having at least 40%, preferably at least 70% by weight of butadiene in the polymer molecule and having at least 80% by weight of the butadiene therein in the vinyl type of butadiene repeating unit structure. The average molecular weight (determined by intrinsic viscosity measurement) is at least 12,500 and the molecular weight distribution is such that at least 50% and preferably 90% of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processability and good flow during molding the average molecular weight should be no greater than 55,000. This corresponds to an intrinsic viscosity of about 0.7 taken at 25° C. or about 0.68 taken at 30° C.

The proportion of peroxide used is equivalent to approximately 0.5–6 parts by weight of dicumyl peroxide per 100 parts by weight of polymer, and the peroxide is one which gives radicals having the structure $R_2(CH_3)CO\cdot$, where R is a hydrocarbon radical of 1–20 carbon atoms. The butadiene polymer also should have a dilute solution viscosity of 0.19–0.7, preferably 0.3–0.6. The amount of peroxy compound used in the curing process of this invention is considerably higher than is normally used for rubber vulcanization. For commercial operations the amount of peroxide is advantageously about 1.5–3 parts per 100 parts of polymer.

The curing temperature is advantageously at least 250° F. (120° C.), preferably about 300–350° F. (150–180° C.). Generally no advantage in the process or product is obtained by exceeding a temperature of 420° F. (215° C.). Obviously, the higher the temperature the shorter will be the curing time required. Generally at 350° F. (180° C.) a satisfactory cure is obtained in less than four minutes, and in some cases even within 10 seconds. Cure times of more than four minutes usually provide no added advantage. Where fast cures are desired it is necessary to use a filler to avoid crazing or cracking. A filler, such as silica, is advantageously used in the proportion of 25–65, preferably 40–60 volume percent based on the combined resin-filler composition.

Although butadiene homopolymers are preferred in the practice of this invention, butadiene copolymers can also be used where the comonomers impart desirable properties and do not detract from the polymer properties. The comonomers are preferably vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alpha-methyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4 - chloronaphthalene, 1-isopropenyl-5-chloronaphthalene, vinyl diphenyl, vinyl diphenylmethane, isopropenyl diphenyl, isopropenyl diphenylmethane, vinyl diphenyl ethane, 4-vinyl-4'-methyl diphenyl, 4-vinyl-4'-chlorodiphenyl, and the like. Where such comonomers are to be used, generally at least 1%, preferably at least 5% by weight should be used and as much as 60% may be used.

In addition to the other factors described herein, an essential element is the viscosity of the butadiene polymer used in the practice of the invention. With higher molecular weight polymers and correspondingly more viscous polymers, it is more difficult to distribute the peroxide and filler uniformly throughout the polymer and flow during molding is severely limited. It has been found in accordance with this invention, polymers having molecular weights above 100,000 are very difficult to process thereby resulting in non-uniform distribution of curing agents, modifiers and fillers, with erratic results, longer cure time and poorer properties. Preferably the average molecular weight is no greater than 50,000. While very low molecular weight and thus less viscous polymers are more easily processed, the resultant mixtures do not cure at the desired rate, and the desired properties are not attained in the cured product.

The viscosity of the polymer, the molecular weight distribution and the percent of vinyl repeating units in the polymer are very critical elements in the invention. Properties will vary for a particular average molecular weight depending on the molecular weight distribution. For example, an average molecular weight of 50,000 in one case can comprise a broad molecular weight distribution having molecular weights from 1,000 to 500,000, and in another case a narrow molecular weight distribution ranging from 40,000 to 60,000. The properties of the two can vary considerably even though the two may have the same average molecular weight.

High viscosity and high molecular weight polymers have poor flow, and are much more difficult to compound and to use in molding operations. However, polymers of low viscosity and low molecular weight have slow cure rates and fail to develop suitable physical properties. For vinyl contents of at least 80%, suitable polybutadienes have dilute solution viscosity in the broad range of 0.19 to 0.7 and preferably in the range of 0.2 to 0.6, which ranges correspond to molecular weight ranges of 12,500 to 55,000 and of 13,500 to 50,000. The dilute solution viscosity is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration.

A very important factor in this invention is the fact the polymer weight distribution should have at least 50% above a molecular weight of 10,000, preferably 90% above 10,000 and at least 95% above a molecular weight of 2,000. Greater proportions of low molecular weight polymers than specified will result in slow cure rates and loss of properties described for this invention. The average molecular weight (determined by intrinsic viscosity) should be no lower than 12,500.

With regard to molecular weight distribution, molecular weights on the high side are objectionable with regard to workability and processibility of the material. For suitable processibility and workability in compounding, etc., it is desirable not to exceed molecular weights of 55,000. However extension into the low molecular weight regions is also very undesirable in that the cure rate is very slow and the desired properties are not attained.

It is known in the art that anionic polymerization catalysts which are soluble in the particular polymerization system produce polymers with relatively narrow molecular weight distributions. Examples of these are the alkyl and aryl lithium catalysts, and aryl sodium catalysts in ether solution, and sodium and lithium complexes with naphthalene or biphenyl in ether solution. Metallic lithium and sodium and alkyl sodiums, which are insoluble, give undesirably broad molecular weight distribution polymers.

Butadiene polymers of appropriate molecular weight distribution can be prepared by using soluble lithium catalyst to effect the polymerization, such as butyllithium. Sodium catalyzed polymerizations can be used when tetrahydrofuran and naphthalene are used as solvents to give very narrow molecular weight distributions. It is also possible, by extraction separation methods, to prepare polymers having appropriate molecular weight distribution for the purpose of this invention. It has been found that polymers producing desirable properties in the cured product will cure in the formulations given below to a Rockwell E hardness of 70 or more within one minute at 175° C. (347° F.).

A convenient means for determining molecular weight distribution is by GPC chromatography which is based on the principle that when a polymer solution is passed through a series of columns containing microporous gels of different pores sizes the polymer is selectively released according to its molecular weight. The higher molecular weight polymer is released more quickly and the lower molecular weight polymer is retained for longer periods in the columns. Thus this continuous means of measuring polymer concentration as the solution comes out of the columns gives a curve which is related to the molecular weight distribution.

By using polymers of known molecular weight and passing a solution of them through the columns and determining the time of retention (counts) for their particular molecular weights, a calibration curve of molecular weight versus counts can be obtained for a particular set of columns, the concentration being measured by the difference of refractive index of polymer solutions as compared to the refractive index of pure solvent. A typical calibration curve is shown in FIG. 5.

Then by passing through the columns a solution of an unknown sample of polymer of that particular type, and determining the concentration of polymer by differential refractive index in accordance with the counts or time transpired, it is possible to plot a molecular weight distribution curve as in FIGS. 6–11. Differential refractive index is thhe difference between the refractive index for the solution from the GPC column and for use pure solvent respectively. By drawing a vertical line from the base at the point for a specific molecular weight, the area under the curve to the left of the line represents the amount of polymer having less than that specific molecular weight. By dividing that area by the total area under the curve it is possible to determine the fraction or percentage of polymer below a specified molecular weight.

In accordance with such determinations, it has been found that butadiene polymers having a molecular weight distribution such that 50% or more, preferably 90% or more, of the molecular weight is above 10,000 and also having at least 95% of the polymer above a molecular weight of 2,000, give very fast cure rate and upon curing have the desirable properties described herein.

The following comparisons illustrate the effect of various vinyl contents, dilute solution viscosities and molecular weight distribution on the resultant Rockwell E hardness for various cure times.

In this test the following formulation is used, the amount of peroxide being the maximum and much more than is generally used commercially:

|  | Parts |
|---|---|
| Polybutadiene | 100 |
| Silica (200 mesh) | 400 |
| Calcium Stearate | 3.0 |
| Vinyl Triacetoxysilane | 3.0 |
| Dicumyl Peroxide | 6.0 |

A cure temperature of 350° F. (175° C.) is used in the compression mold.

From the data in the table it is very apparent that the polymers having less than 80% of the polymer in the pendent vinyl structure, as illustrated by Samples A and B, are very slow in curing.

Polymer Sample C is a borderline case when loaded with dicumyl peroxide. With 90% above 10,000 molecular weight and 98% above 2,000 M.W. and also with a 68% vinyl content and an average molecular weight of 22,000, a cure time of one minute gives a hardness of 91 on the E scale. This is better than any of the others have even with a four minute cure time. However, as shown in Table 2, this vinyl content does not give satisfactory cure when a more normal amount of peroxide is used.

Sample D is also a borderline case having an average molecular weight of 12,500 and, although the percent above 2,000 molecular weight is 98% and the vinyl content is 92.5, the percent above 10,000 molecular weight is also close to the border, namely 53%. Even with the large amount of peroxide, the cure test barely meets the E hardness test of 70 for a one minute cure time.

With the advantage of a higher average molecular weight, namely 70,000, Sample A meets the test for higher than 10,000 molecular weight with 59%, but still, apparently because of the 72% vinyl content and because its 87% fails to meet the 95% requirement above 2,000 molecular weight, it falls short in the cure test by achieving an E hardness of only 67 in a one minute cure. Sample B similarly falls short with an E hardness of 54 being achieved in a one minute cure time, apparenty because of its 62% vinyl content and its having only 88% above 2,000 M.W.

Samples E and F which meet the requirement for high vinyl content with 90% and 95% respectively, all fail the hardness tests by virtue of low average molecular weights, low percentages above 10,000 molecular weight and low percentages for molecular weight above 2,000. Sample D because of its 74% vinyl content and low molecular weight distribution likewise fails. Thus Sample E achieves a hardness of 72 only after four minutes cure time, and the Sample F, even after 16 minutes cure time, has a hardness of 7.6. Sample G, even after 16 minutes cure time is too soft to measure.

Sample I shows the criticality of having high vinyl content in order to attain the standard of hardness upon cure. In spite of the average molecular weight being over 100,000, which makes it difficult to process, and the percent of polymer having molecular weights exceeding 10,000 and exceeding 2,000 being in each case over 95%, a hardness of only 64 is obtained even with two minutes cure time. Consequently, even with the curing advantage of high molecular weight in each of the respects defined, it is still necessary to have a content of at least 80%, and preferably at least 90% of the pendent vinyl type of butadiene repeating unit.

The series of experiments summarized in Table 2 shows the effect of varying the peroxide content in curing various polybutadienes in the following recipe with a cure time of 2 minutes at 175° C. (350° F.). Each of

TABLE 1

| Identification number | Polym. catalyst used in preparation | Vinyl | Average mol. wt. (intrinsic viscosity method) | Percent above 10,000 M.W. | Percent above 2,000 M.W. | Cure time (min.) | Rockwell E hardness scale |
|---|---|---|---|---|---|---|---|
| A | Na | 72 | 70,000 | 59 | *87 | 4 / 1 | 86. / 67*. |
| B | Na | 62 | 31,000 | 54 | *88 | 4 / 1 | 82. / 54*. |
| C | BuLi | **68 | 22,000 | 90 | 98 | 1 | 91. |
| D | BuLi | 92.5 | 12,500 | 53 | 98 | 4 / 1 | 87. / 70. |
| E | BuLi | 90 | *6,400 | *14 | *89 | 4 | 72*. |
| F | BuLi | 95 | *3,300 | *1 | *63 | 16 | 7.6*. |
| G | Commercial product | 74 | *5,700 | *16 | *76 | 2 | Too soft*. |
| H | BuLi | 43 | 100,000 | 95 | 95 | 2 | 64*. |

*Unacceptable according to criteria of this invention.
**This vinly content gives appropriate curing in this case when loaded with peroxide but is insufficient with ess peroxide as shown below in Table 2.

the polymers has substantially all of the polymer above 2,000 and at least 60% above 10,000.

| | Parts |
|---|---|
| Polymer | 100 |
| Silica | 400 |
| Calcium Stearate | 3 |
| Acrylosilane | 3 |
| Dicumyl Peroxide | as shown |

The curing results are as follows:

| Cure Time, Minutes | Hardness |
|---|---|
| 1 | Too soft for Rockwell E measurement. |
| 2 | Too soft for Rockwell E measurement. |
| 4 | 37 Rockwell E. |
| 8 | 71 Rockwell E. |
| 16 | 79 Rockwell E. |

TABLE 2

| Identification number | Parts peroxide | Percent vinyl | Intrinsic viscosity | Average M.W. | Rockwell E hardness | Flexural Strength ×10³ | Flexural Modulus ×10⁶ |
|---|---|---|---|---|---|---|---|
| I | 6 | 65 | 0.27 | 16,000 | 59 | 7.95 | 0.80 |
| J | 6 | 93 | 0.37 | 29,000 | 98 | 10.4 | 1.27 |
| K | 3 | 83 | 0.41 | 38,000 | 89 | 12.1 | 1.35 |
| L | 3 | 90 | 0.37 | 29,000 | 84 | 12.6 | 1.53 |
| M | 1.5 | 65 | 0.27 | 16,000 | (¹) | 2.75 | 0.14 |
| N | 1.5 | 92 | 0.39 | 31,000 | 80 | 12.0 | 1.35 |

¹ Too soft.

When Sample L is repeated using 3 parts of peroxide for a 1 minute cure, the Rockwell E hardness is 86, the Flexural Strength is $12.1 \times 10^3$ and the Flexural Modulus is $1.34 \times 10^6$. These values are almost the same as obtained in the 2 minute cure which indicates that the cure was substantially completed within 1 minute.

EXAMPLE A

The procedure of Example I of Gleason U.S. Pat. No. 2,772,254 is repeated since this is a prior art illustration of a butadiene polymerization catalyzed by sodium in the presence of an ether promoter, such as dioxane, which is reported to give a high vinyl content in the polymer product. Accordingly the following recipe is polymerized overnight at 50° C. in a 28 oz. sealed bottle:

| | Gms. |
|---|---|
| Butadiene | 79 |
| Styrene | 19.6 |
| Naphtha | 199.2 |
| Dioxane | 29.2 |
| Sodium | 1.5 |

Conversion is quantitative and the catalyst is destroyed by adding 0.30 gm. of isopropanol. The polymer product (85 gm.) is dissolved in and diluted with benzene to give 880 mls. of solution (9.567 gms. polymer per 100 ml. of solution). To this 880 ml. of solution there are added increments of 50 ml. of methanol. The fourth increment (totaling 200 ml. of methanol) produces a slight turbidity. The solution is then heated to 60° C., an additional 25 ml. of methanol is added and the resultant solution added to a separatory funnel. The solution is allowed to cool and stand until the precipitate has completely settled. The solution is drawn off and to it is added another 200 ml. of methanol, following which the temperature is raised to 60° C. After allowing the solution to cool and the precipitate to settle, the remaining solution is withdrawn. The two precipitates are combined (20 gms. and 54.6 gms. respectively) totaling 74.6 gms. or 87.8%, leaving 12.2% of the polymer in the solution. This 12.2% represents the more soluble, low molecular weight portion of the polymer. The recovered higher molecular weight portion is dried and molded at 350° F. (175° C.) in the following recipe:

| | Parts |
|---|---|
| Polymer | 100 |
| Silica (325 mesh) | 400 |
| Calcium Stearate | 0.3 |
| Vinyl Triacetoxysilane | 3 |
| Dicumyl Peroxide | 6 |

These results show that, even by following Whitby's teaching for the removal of a substantial portion of the lower molecular weight portion of a high vinyl butadiene polymer, fast curing to a satisfactory hardness is not obtained on the remaining higher molecular weight portion of the polymer.

EXAMPLE B

In order to show that the sulfur vulcanization of Whitby is not the equivalent of applicants' peroxide curing a polybutadiene fitting applicants' qualifications, namely 88% vinyl, an average molecular weight of 30,000, DSV of 0.38, 70% over 10,000 mol. wt. and 98% over 2,000 mol. wt., is solution blended in the standard recipe:

| | Parts |
|---|---|
| Polybutadiene | 100 |
| Silica | 400 |
| Calcium Stearate | 0.3 |
| Vinyl Triacetoxysilane | 3.0 |

This is dried and then milled at 150° F. (65° C.) with the following typical sulfur vulcanization composition using:

| | Parts |
|---|---|
| Sulfur | 6 |
| ZnO | 15 |
| Santocure N.S. | 3.6 |
| Stearic Acid | 6 |

The milled sample is cured at 175° C. with the following results:

| Cure Time (Minutes): | Hardness |
|---|---|
| 1 | No cure. |
| 2 | Do. |
| 4 | Do. |
| 8 | Do. |
| 16 | Too soft to be measured for Rockwell E. |

In addition to the effect that the vinyl content has on the cure rate and on the hardness properties in the cured product, the high vinyl content also has a notable effect on the chemical resistance properties of the cured products.

This is illustrated somewhat by a number of tests performed on two polybutadiene samples, one containing 93% vinyl-containing butadiene repeating monomer and the other containing 65% of that type of repeating monomer. The formulation is the same as that used for the experiments reported in the above table, except that 3 parts instead of 6 parts of dicumyl peroxide, and 3 parts of methacryloxypropyl trimethoxysilane instead of 3 parts of vinyl triacetoxysilane, are used.

Sample AA has 93% of the vinyl-type repeating unit, a DSV of 0.37, a $M_v$ (molecular weight determined by intrinsic viscosity) of 25,000, and the polymer has more than 90% by weight of molecular weight above 10,000.

Sample BB has a vinyl-type repeating unit content of 65%, a DSV of 0.25, an average $M_v$ of 17,000, and the polymer contains more than 90% having a molecular weight above 10,000.

While the vinyl content in both cases is above the 60% lower limit specified for vinyl-type repeating units, the chemical resistance of Sample BB, while very good, is not as good in a number of properties as the considerably superior Sample AA.

Both samples are cured at 175° C. for a sufficient period to obtain a comparable hardness, modulus and flex strength. Sample AA required two minutes to cure to this hardness and Sample BB is cured for six minutes to obtain the desired hardness.

A number of samples of each of the cured products are aged individually in a variety of chemicals for one month at room temperature. Changes in flexural strength and hardness from the original measurements prior to the chemical tests are reported in the following table:

CHEMICAL AGING TEST

| Chemical used in test | Percent change in Flexural strength | | Percent change in Rockwell E hardness | |
|---|---|---|---|---|
| | Sample BB | Sample AA | Sample BB | Sample AA |
| Toluene | −38 | +2.8 | −9.3 | −0.5 |
| Dimethyl sulfoxide | +0.3 | +14 | +0.1 | +1.3 |
| Tetrahydrofuran | −20.6 | +9.6 | −5.6 | −0.3 |
| 50% NaOH | −1.2 | −1.5 | −0.2 | −0.1 |
| $H_2O_2$ | −8.8 | +0.1 | +3.1 | +5.6 |
| 95% $H_2SO_4$ | −26.3 | −7.2 | −18.3 | −11.0 |
| Red fuming $HNO_3$ | Destroyed | −1.4 | Destroyed | −1.3 |
| $Br_2$ | +15.6 | +14.0 | +1.6 | +0.9 |

Changes in flexural strength of less than ±10% are not significant. Particular superiority of Sample AA (93% vinyl) is shown in toluene, tetrahydrofuran, 95% sulfuric acid, and especially red fuming $HNO_3$. While the sample with 65% vinyl content still shows good chemical resistance in many cases the indication is that low vinyl content butadiene polymers have much less chemical resistance.

While the DSV of the butadiene polymer is advantageously at least 0.19, it is generally preferable to work with polymers having a DSV of 0.3 or higher. It is advantageous to work with polymers having viscosities as high as can be tolerated in the various processing steps for mixing the peroxide and thereafter fabricating the product. Obviously, the more viscous polymers present greater difficulty in uniform distribution of the peroxide in the polymer.

The process of this invention lends itself very easily and conveniently to liquid compounding whereby the butadiene polymer can be blended into solvents for compounding, and the solvent removed prior to fabrication and curing of the polymer-peroxide blend. In solution compounding, the polymer is dissolved or suspended in hexane, heptane, toluene or other solvent such as used in the preparation of the polymer. The solution is mixed with the peroxide and a filler, as well as any other modifiers; next the solvent is removed, for example, by evaporation; and then the polymer composition is processed according to ordinary techniques. If desired, the components may be mixed by mill blending, using double arm mixers or other types of internal mixers.

The compounded mixture can be cured in various forms including laminates, and can be molded in any conventional molding equipment including compression, transfer and injection types. The peroxide-cured products of this invention have relatively good color, are generally opaque and have excellent heat resistance. These products have excellent chemical resistance and are essentially immune to swelling in hydrocarbon solvents including benzene.

Cured products having a flexural modulus of 300,000 to several million p.s.i. can be obtained. Rockwell M hardnesses of 80–120 and Rockwell E hardnesses of 70–110 are easily obtained, with heat distortion temperatures in excess of 400° F. (200° C.) and in many cases about 500° F. (260° C.).

Some of the improvements of this invention are illustrated by the drawings.

Figure 13:
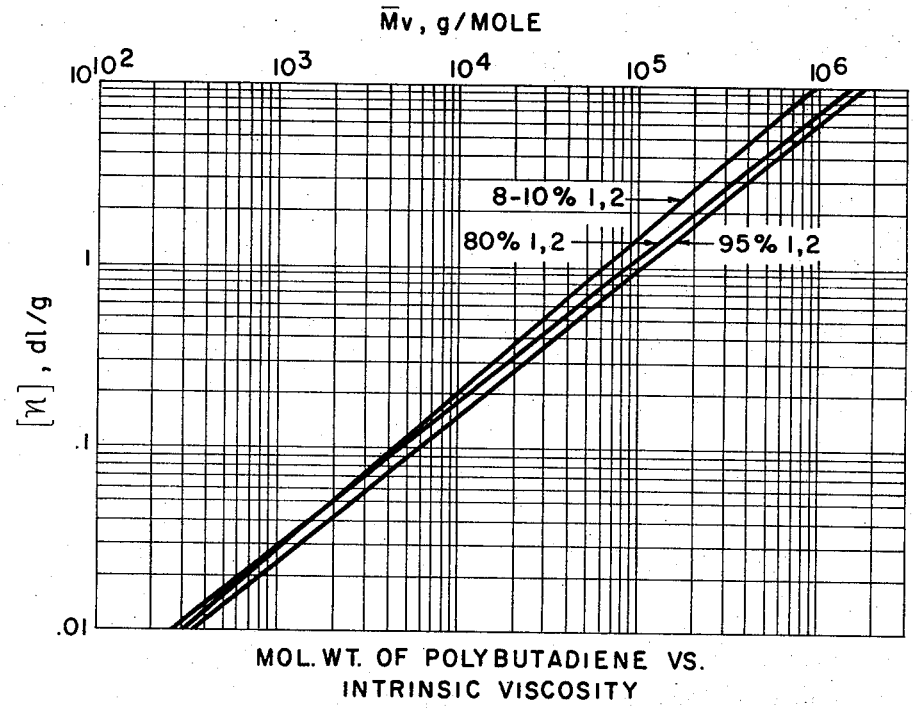
FIG. 13 shows three curves of average molecular weights plotted against intrinsic viscosities at 25° C. with the values for the respective curves being for polybutadienes of 8–10%, 80% and 95% 1,2- configuration respectively.
Figure 12:
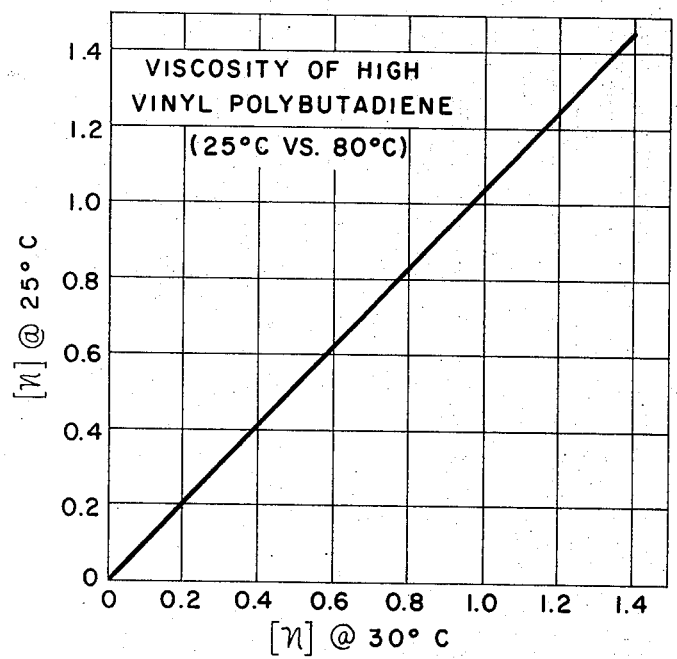
FIG. 12 is a curve of intrinsic viscosity at 25° C. plotted against viscosities at 30° C. enabling a person to translate from one set of values to the other.

From the curces of FIG. 13 it is obvious that the various polymers having different vinyl contents will have somewhat different molecular weights for a particular intrinsic viscosity, with the molecular weight increasing for a particular intrinsic viscosity value in accordance with increase in vinyl content. However the ranges of average molecular weight ranges given herein are appropriate for polymers having 1,2- contents of 80% or more. For greatest ease in processability it is preferred not to exceed a molecular weight of 45,000 for 95% vinyl and not above 35,000 for 80% vinyl.

The peroxides used are advantageously those having a reasonably fast rate of decomposition at the temperature being used. In some cases it is desirable to use a mixture of peroxides, one having a faster rate of decomposition as the temperature is raised gradually to the desired temperature range, and the other peroxide being slower to decompose in the lower temperature range, but reaching a high rate of decomposition later in the heating period.

The peroxides suitable for use in the practice of this invention can be represented by the formula

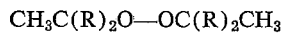

$$CH_3C(R)_2O-OC(R)_2CH_3$$

wherein R represents aryl or alkyl, including cycloalkyl, aralkyl, alkaryl, etc., of 1–20 carbon atoms. The respective R groups in the particular compounds can be similar or dissimiliar. Typical R groups include methyl, ethyl, propyl, butyl, hexyl, heptyl, decyl, dodecyl, octadecyl, phenyl, tolyl, xylyl, benzyl, phenethyl, naphthyl, methylnaphthyl, naphthylethyl, diphenyl, benzylphenyl, butylphenyl, cyclohexyl, cycloheptyl, cyclohexylmethyl, cycloheptylethyl, methylcycloheptyl, etc.

Typical peroxy compounds of the above formula which decompose to give the desired free radical, namely $CH_3C(R)_2O\cdot$, include various diperoxides and mixed peroxides. Specific illustrations of these include dicumyl peroxide, ditertiarybutyl peroxide, tertiarybutyl-cumyl peroxide, ditertiaryamyl peroxide, tertiarybutyl-tertiaryamyl peroxide, tertiaryamyl-cumyl peroxide, ditertiaryoctyl peroxide, bis(1,1-diphenyl-ethyl) peroxide, bis(1,1-dicyclohexyl-ethyl) peroxide, bis(1-cyclohexyl-1-methyl-ethyl) peroxide, bis(1-phenyl-1-ethyl-ethyl)peroxide, etc. The symmetrical peroxides which have identical groups on each side of the peroxy oxygenations are more easily available and therefore preferable. However, where mixed peroxides, that is peroxides having two different $CH_3C(R)_2O\cdot$ radicals, are available, these can be used very satisfactorily.

The peroxy catalyst is advantageously used in an amount equivalent to 0.5–6 parts by weight of dicumyl peroxide per 100 parts by weight of polymer. Since the molecular weights of the various peroxy compounds vary, the proportions required to give the same amount of peroxy groups or free radicals is determined by the equivalent weight. Therefore the proportions of peroxy compound required to effect the desired curing or rate of curing is defined as the amount equivalent to 1–7 parts by weight of dicumyl peroxide. Sometimes commercial peroxides are sold in diluted form such as "Dicup 40." These can be used, the amount used being calculated according to the actual peroxide content.

The optimum proportion of peroxide depends on the percentage of vinyl repeating units contained in the polymer, the higher vinyl content polymers requiring less catalyst within the indicated range, and the lower vinyl content polymers within the cited percentage range requiring more of the peroxy compound. Preferably 0.5–3 parts of dicumyl peroxide or equivalent amount of other peroxy compound is used for polymers having a vinyl repeating unit content of 80% or more and 3–5 parts of dicumyl peroxide or equivalent amount of other peroxy compound is preferred for polymers being on the borderline with a number of the required limitations.

For fast cure the polymers are loaded with a high volume of fillers. Advantageously 25–65 volume percent of filler is used, and preferably 40–60 volume percent. Lower amounts of filler usually result in products having inferior physical properties and a strong tendency to crack during the molding operation. Suitable fillers include silica, asbestos, alumina, mica, feldspar, talc, clay, powered metal, such as aluminum, iron, brass, zinc and the like, wood flour, cellulosic fibers, carbon black, graphite, etc. Silica is preferred and the other inorganic fillers listed are next in order of preference. Particle size of filler is limited only by practical considerations of mixing and compounding.

For maximum development of desired properties, it is desirable to add an agent to effect coupling between the filler and the polymer. Particularly suitable for this purpose are organosilane compounds, such as:

n-(Dimethoxymethylsilisllisobutyl) ethylenediamine:
$(CH_3O)_3Si(CH_2)_3NH(CH_2)_2NH_2$ n-(Dimethoxymethylsilyisobutyl) ethylenediamine:

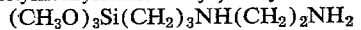

γ-Methacryloxypropyltrimethoxysilane:

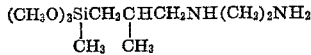

γ-Glycidoxypropyltrimethoxysilane:

$OCH_2CHCH_2O(CH_2)_3Si(OCH_3)_3$

Vinyltrichlorosilane: $CH_2=CHSiCl_3$
Methylvinyldichlorosilane: $CH_3(CH_2=CH)SiCl_2$
Vinyltriacetoxysilane: $CH_2=CHSi(OOCCH_3)_3$ γ-Chloropropyltrimethoxysilane:

$$ClCH_2CH_2CH_2Si(OCH_3)_3$$

The polymer of this invention as defined by the specific limitations described above with respect to percent of pendent vinyl group repeating units, average molecular weight ($M_v$), percent by weight above 10,000 molecular weight, percent by weight above 2,000 molecular weight and dilute solution viscosity, is believed to be new per se. In addition to its various uses as described herein for fast curing compositions in which a high percentage of filler is used to avoid crazing and cracking, the polymer of this invention can be cured neat in thin films no thicker than $\frac{1}{32}''$ and preferably no thicker than $\frac{1}{64}''$, where the heat is distributed quickly and uniformly in the curing operation, and also in molding compositions cured at a lower temperature and slower curing rate to avoid crazing and cracking. Films, coatings and molded products prepared from this material, even without filler, have improved flexural strength, hardness and chemical resistance and can be used for various purposes where protective coatings or compositions of superior flexural strength, hardness and resistance to chemicals and heat are advantageous.

For such purposes the butadiene polymer likewise has at least 80% and preferably more than 90% of the butadiene repeating units with a pendent vinyl group, has a viscosity-measured average molecular weight between 12,500 and 55,000, has at least 50% and preferably at least 90% by weight of the polymer of a molecular weight greater than 10,000, has at least 95% by weight of the polymer with a molecular weight greater than 2,000.

In the various curing operations described herein, either with or without filler, advantageous properties are obtained when at least 50%, and preferably at least 70% of the total unsaturation of the polymer is consumed or used up in the curing process. The amount of remaining unsaturation can be determined easily by infrared analysis.

In order to obtain the intimate mixing of the polymers with the large amounts of filler required, it is most practical to effect the mixing by liquid or solution compounding. For such purposes it is generally desirable to produce the starting polymers in solvent media. The preferred solvent is a mixture of tetrahydrofuran and hexane, the proportions of each varying according to the microstructure desired and the molecular weight desired in the polymer. With higher molecular weight polymers or polymers having a higher DSV in the range cited, more dilution is required in order to obtain a mixable viscosity. Then again, the use of greater amounts of solvent affects the economics involved in the removal and recovery of the solvent.

The compounding of the filler and polymer can be performed in a Cone Vertical Mixer which imparts good mixing action. A Baker-Perkins Mixer is preferred for large batches, and a Bramley Mixer and other types of double arm mixers can also be used for this purpose. In some cases, with relatively small amounts of filler, stirring by hand or with a laboratory propeller type stirrer may be adequate. With a high filler content, and particularly with high density fillers such as silica, it is best to maintain a total solids level of about 60% (for 0.3–0.4 DSV polymer) to produce sufficiently high viscosity to prevent settling out of the silica.

After solution mixing of the components, the solvent is removed to avoid gassing or bubble formation at elevated curing temperatures. For filler compositions this is done conveniently by vacuum drying at room temperature or temperatures up to 50° C. With laminates, the solution of resin is used to impregnate a fabric and the solvent is allowed to air dry at room temperature to produce the "prepreg". Other appropriate drying systems can also be used.

The solution mixing technique can be used in a 100% solids system by using as the solvent a copolymerizable monomer liquid such as styrene, vinyl toluene, methyl methacrylate, t-butyl styrene, etc. In such cases it is found unnecessary to remove the solvent since this is copolymerized with the butadiene polymer in the curing operation. Tertiarybutyl styrene is found to be particularly attractive because its high boiling point allows high temperature cures to be used without bubble formation. With polymers having a DSV value of 0.2–0.4 the material can be kept liquid by keeping it hot. However, polymers having a DSV of more than 0.4 are advantageously handled in solution form until compounded.

The prior art attributes the properties produced by the curing of polybutadiene to the development of regular cyclic structures. However in the process of this invention, little or no cyclization occurs during the peroxide cure of the high vinyl polybutadienes. Actually the data indicate that a very high crosslinked density is responsible for the improved properties produced according to this invention.

The density of the polymer increases very rapidly with increasing state of cure from 0.89 at no cure to about 0.99 and then slowly rises to the limiting value of about 1.00. The value of 0.99 corresponds to a reciprocal swelling index (grams of polymer per gram of toluene) of 4 which is considered to be the minimum amount of cure for satisfactory properties.

At a reciprocal swelling of 4, the molecular weight between crosslinks (Me) is calculated as 107. At higher reciprocal swelling values, the molecular weight between crosslinks decreases, and values as low as 55.2 have been noted. In comparison, well-cured rubber has values in the order of 6,000–8,000. These extraordinarily low values indicate a very high crosslinked density that can be obtained only by some sort of polymerization reaction which destroys double bonds. Infrared studies confirm the loss of double bonds.

Swelling studies made in conjunction with rate of decomposition of peroxide show that with the use of dicumyl peroxide and a 93% vinyl polybutadiene the number of crosslinks produced per free radical generated is in the range of 56–184. The higher number of crosslinks per free radical generated is obtained with lower concentrations of catalyst used at lower temperatures. This efficiency is drastically reduced as the vinyl content is lowered.

Studies of a large number of free radical sources show that only those compounds that initially decompose to $R_2C(CH_3)O\cdot$ are effective in producing the high crosslink densities required. It is believed that these radicals decompose to ketone and methyl radicals with the latter being the effective catalyst.

Studies made on the products produced according to this invention show quite conclusively that little or no cyclization occurs during the peroxide cure of the high vinyl polybutadienes. Pyrolysis gas chromatography of a high vinyl polybutadiene cyclized with sulfuric acid gives an entirely different thermogram than for one cured by the peroxide according to the present invention. Moreover, no differences in thermogram resulted from variations in the state of cure and only very slight differences are noted as a result of changes in vinyl content within the indicated range. The only reasonable conclusion from these observations is that a very high crosslinked density is responsible for the improved properties produced by this invention.

In the very low molecular weight, liquid polymers used in the prior art, the cure is relatively slow and the product is extremely brittle since the desired rigidity is obtainable only by a very high degree of crosslinking. On the other hand, the high molecular weight solid polymers, e.g. above 55,000 and particularly above 100,000 as typified by rubbers, and shown in the prior art as mixed on "dry" compounding equipment, have a very high viscosity and a lack of flowability which makes it difficult to impregnate a laminate to the degree necessary for high strength and are not moldable with a cure system to develop a rigid crosslink network.

The process of this invention provides a fast, simple and economical process for producing thermosetting resins of high thermal stability. It also provides good workability of the polymer in the precured stage and easy and accurate control of the entire process. The product is processed without the elimination of volatile materials and can be used with starting polymers which have antioxidants or stabilizers therein.

It appears that the invention achieves its improved results on the basis of the combination of the different conditions described, namely the amounts of vinyl structure in the polymer, the viscosity range of the starting polymers, the molecular weight distribution as defined, the amounts of peroxide, and in the case of fast curing compositions the presence of sufficient filler to avoid crazing and cracking, and the temperature used. This combination of conditions effects a substantial amount of crosslinking in the polymer thereby producing rigidity and resistance to chemicals and heat.

MOLDING COMPOSITIONS

Molding compositions can be prepared according to this invention having a cure time of no more than 4 minutes, preferably no more than 1 minute, comprising essentially (1) a polymer advantageously having at least 40% by weight, preferably at least 70% by weight butadiene and a dilute solution viscosity in the range of 0.10–0.7, preferably 0.3–0.6, at least 50% by weight, preferably at least 90% of the polymer having a molecular weight of at least 10,000 and at least 95% of the polymer having a molecular weight of at least 2,000, and having at least 80% by weight of the butadiene in the polymer consist of vinyl-type butadiene repeating units, (2) 0.5–6 parts by weight, preferably 1–5 parts per 100 parts by weight of polymer, of a peroxide compound having the formula

$$CH_3C(R)_2O\text{---}OC(R)_2CH_3$$

and a 25–65 volume percent, preferably 40–60 volume percent, based on combined volume of polymer, peroxy compound and filler, of a filler material which is substantially inert to the polymerization reaction.

The molding compositions can be used advantageously in compression molding, transfer molding and injection molding. For the respective types of molding operation, the more specifically defined dilute solution viscosity ranges for polybutadiene are: 0.19–0.7, preferably 0.3–0.6 for compression molding; 0.19–0.6, preferably 0.2–0.4 for transfer molding; and 0.3–0.7, preferably 0.3–0.4 for injection molding. The corresponding molecular weight ranges are: 12,500–55,000, preferably 22,000–52,000 for compression molding; 12,500–52,000, preferably 13,500–31,500 for transfer molding; and 22,000–55,000, preferably 22,000–31,000 for injection molding. The preferred DSV values are determined on a filler content of 400 parts of silica per 100 parts of resin. With less filler or with different types of fillers the preferred ranges of viscosities may be raised somewhat but still within the broad range specified.

The presence of the filler as described herein allows a very short curing cycle which is one of the main advantages of this invention. If the filler is not used in the proportions indicated, and the same temperature is used for curing as defined herein, the polymer, if cured quickly, generally produces a crazed or cracked product and often generates heat so rapidly as to cause the polymer to char. The use of the filler moderates the effects of the heat generated so that a very short cure cycle can be used without risking these undesirable effects.

Thus by selecting the conditions described for this invention, it is possible to have a resin molding composition with good flow properties and fast curing and setting cycles to produce resins having a combination of very good properties such as good chemical and heat resistance, high heat distortion resistance, excellent electrical properties and low water absorption. By careful control of a number of conditions, including dilute solution viscosity or molecular weight, percentage of vinyl-type butadiene repeating units and proportions of peroxy compound and of filler, it is possible to cure these molding compositions in a very short time, in any case in less than 4 minutes and in most cases in less than 2 minutes, and in some cases in less than 1 minute, to give molded products of a variety of excellent properties. The type and amounts of peroxide, the amounts of filler, dilute solution viscosity, etc., are as described above.

As indicated above, the high shrinkage and exotherm of the curing reaction requires the presence of a filler to avoid cracking and other bad effects. As a filler for this purpose, silica is preferred. It has the advantage of a very low cost and very good physical properties for this purpose. Other materials particularly suitable as fillers include alumina, mica, feldspar, talc, asbestos, clay, powdered metal, such as aluminum, iron, brass, zinc and the like, carbon black, graphite, wood flour, cellulose fiber, etc. Glass fiber as such or in the form of glass cloth or glass mat is also considered as a suitable filler as described hereinafter. In most cases a coupling agent is desirable to give optimum properties. The coupling agent, such as an organosilane compound, aids by forming a bond between the filler, such as silica, and the resin.

SPECIFIC EMBODIMENTS OF THE INVENTION

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

Example I

A series of experiments are performed to give fundamental information on the "neat" or unfilled resin or polymer. Since the unfilled resin cracks or crazes upon the fast curing effected at the temperatures used, the moldings are made extremely thin, namely 1/64 inch. If greater thickness is molded, such as the 1/10 inch thickness effected in Example II, the fast cures generally produce cracked moldings. The respective resin compositions are prepared as follows: 13.3 grams of a hexane solution containing 75% polybutadiene is weighted into a beaker The polybutadiene has the vinyl content and dilute solution viscosity indicated in the table below. To this solution is added the desired amount of dicumyl peroxide dissolved in chloroform. The amount is reported as parts per hundred of resin or polymer (p.h.r.). After mixing well the hexane and chloroform are removed at room temperature by applying a vacuum of 0.1 mm. Hg for at least 4 hours. The dried catalyzed resin is then pressed in a mold containing 9 cavities adapted for the individual removal of the respective cured samples after different times of heating. Each of the cavities has a diameter of 1/4". The moldings are made at approximately 110 p.s.i. pressure to give a thickness of 1/64" and are cured at the indicated temperatures. The curing time of the neat (or unfilled) resin and the various conditions are tabulated below in Tables I through Ib. Each of the resins tested has an average molecular weight in the range of 20,000–30,000 and has more than 95% of a molecular weight above 10,000.

TABLE I

| Percent vinyl (DSV=0.35–0.40) | Dicumyl peroxide, phr. | Temp., °C. | Total cure time[1] (mins.) |
|---|---|---|---|
| 23.4 | 2 | 145 | [2] |
| 43.2 | 2 | 145 | 150 |
| 65.0 | 2 | 145 | 55 |
| 93.0 | 2 | 145 | 37 |

[1] Total cure time is defined as the time required to obtain a reciprocal swelling (gm. polymer/gm. toluene) value of 4.
[2] Very high.

TABLE Ia

| Percent vinyl (DSV=0.35–0.40) | Dicumyl peroxide, phr. | Temp., °C. | Total cure time (mins.) |
|---|---|---|---|
| 23.4 | 2 | 175 | [1] |
| 43.2 | 2 | 175 | 100 |
| 65.0 | 2 | 175 | 7.8 |
| 93.0 | 2 | 175 | [2] 4.2 |

[1] Very high.
[2] Fast cure obtained on very thin (1/64") molding to reduce cracking. If thickness (1/10") of Example II is used, cracking generally results for neat resin.

TABLE Ib

| Percent vinyl (DSV=0.35–0.40) | Dicumyl peroxide, phr. | Temp., °C. | Total cure time (mins). |
|---|---|---|---|
| 65.0 | 8 | 175 | [1] 2.3 |
| 93.0 | 8 | 175 | [1] 1.5 |

[1] See footnote 2 to Table Ia.

The reciprocal swelling index referred to above is determined as follows: Cured polymer samples prepared as described in Example I are placed individually in 100 ml. beakers containing 90 cc. of a 0.2% toluene solution of phenyl-beta-naphthylamine. Each beaker is covered to prevent loss of toluene and is heated for at least 16 hours on a steam bath at about 80° C. At the end of that time the beakers are removed from the bath and allowed to cool to room temperature. After standing at 25° C. for at least two hours, the polymer samples are quickly removed from the toluene, blotted dry and weighed. This should be done in about 15 seconds. The resultant weight is considered the swollen weight of the sample. The dry weight is obtained by drying the swollen samples at 120° C. under a vacuum of 0.15 mm. Hg for at least two hours before weighing. The reciprocal swelling index is calculated by dividing the dry weight of the sample by the weight of toluene absorbed in swelling.

It has been found that a reciprocal swelling index of 4 or more indicates that at least 50% of the unsaturation in polybutadiene has been consumed, which is the lower limit for the purpose of this invention. This corresponds to at least one crosslink being formed between linear polymer chains of polybutadiene for each two butadiene repeating units in the chain. Disappearance or consumption of at least 70% of the unsaturation is preferred and this is equivalent to approximately one crosslink for an average of 1.5 of said repeating units. The percent unsaturation and therefore the relative crosslinking can also be determined by infrared analysis.

Example II

The following formulation is blended in a one gallon Baker-Perkins mixer. The order of addition is preferably as listed below, although this is not critical.

| | Parts |
|---|---|
| Hexane solution of a polybutadiene having a vinyl content of 88% and a DSV of 0.38 in a concentration of 65% polymer* | 167 |
| Silica (200 mesh) | 400 |
| Dicumyl Peroxide (40% active) | 3.75 |
| Calcium Stearate | 3.0 |
| Vinyl Triacetoxysilane | 3.0 |

*Contains more than 95% above 10,000 molecular weight.

After the last ingredient is added, the stirring is continued for 15 minutes at 100 r.p.m. The resultant blend is dried 16 hours in a vacuum oven at 50° C. and one mm. mercury pressure to remove the solvent. This leaves a flat, putty-like cake capable of being cut or hand-formed at room temperature or slightly above. Compression moldings are made from this material by means of a Wabash 75-ton press and a simple flash type hand mold using a temperature of 350° F., a pressure of 16 tons on a 6" ram (1133 p.s.i.) and a two minute cure time. Mechanical properties of the moldings are conducted on a Model TT–C Instron tester. Typical properties of a compression molded product prepared according to the above procedure and having dimensions of 1" x 3" x 1/10" are given below in Table II. Moreover, the values used in plotting the various curves of FIGS. 1, 2, 3 and 4 are obtained by using the above procedure.

TABLE II.—TYPICAL PROPERTIES FOR COMPRESSION MOLDED SILICA FILLED FCR–1261 MOLDING RESIN

| Property | Test method | |
|---|---|---|
| Flexural strength | ASTM D790 | 10–13,000 p.s.i. |
| Flexural modulus | ASTM D790 | 1.3–1.5×10$^6$ p.s.i. |
| Rockwell hardness | E scale | 90–100. |
| Impact resistance | ASTM D256 | 0.25–0.3 lbs./inch. |
| Specific gravity | | 2.05. |
| Heat distortion at 264 p.s.i. | ASTM D648 | 500° F. |
| Flammability | ASTM D635 | Non-burning. |
| Dielectric strength | ASTM D149 | 1,000 volts/mil. |
| Dielectric constant, 1,000 Hz | ASTM D150 | 2.2. |
| Dissipation factor, 1,000 Hz | ASTM D150 | 0.002–0.008. |
| Arc resistance | ASTM D495 | 202 sec. |
| Volume resistivity, R.T. | ASTM D257 | 1.2–1.5×10$^{15}$ ohms. |
| Loss factor | ASTM D150 | 0.005. |
| Mold shrinkage | | 1.5%. |

Similar molded specimens are exposed to a number of reagents for one month at room temperature with no measurable changes in flexural strength, flexural modulus or hardness using the following chemicals:

| | |
|---|---|
| Toluene | Red Fuming Nitric Acid |
| Cyclohexanone | Conc. Nitric Acid |
| Dimethyl Sulfone | Dil. Nitric Acid |
| Kerosene | Conc. Hydrochloric Acid |
| Dimethyl Formamide | Glacial Acetic Acid |
| Tetrahydrofuran | Bromine |
| Tetrachlorethylene | 50% Sodium Hydroxide |
| Chlorobenzene | m-Cresol |
| Formalin | Water |

Exposure to concentrated sulfuric acid results in only slight changes in properties.

Transfer molding compositions

Figure 1:
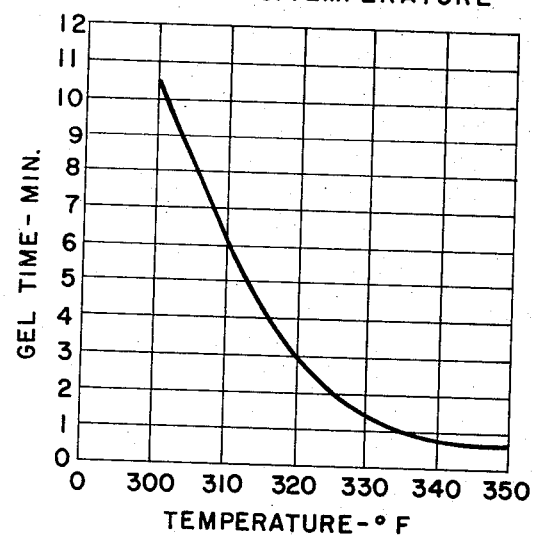
FIG. 1 shows a curve plotting the values of gel time in minutes versus temperature in ° F. for a resin prepared and cured according to the procedure of Example II.
Figure 2:
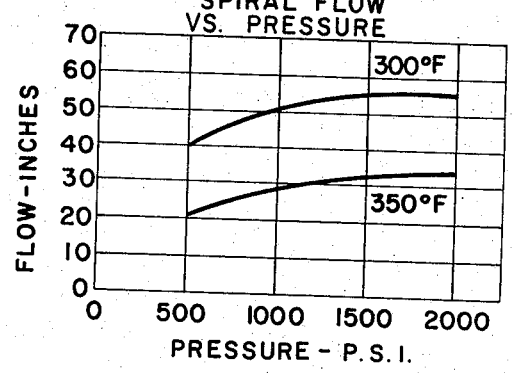
FIG. 2 shows two curves plotted for values of spiral flow in inches versus pressure in pounds per square inch for resins produced and cured by the procedure of Example II, one set of values being determined at 300° F. (150°) and the other at 350° F. (175° C.).
Figure 3:
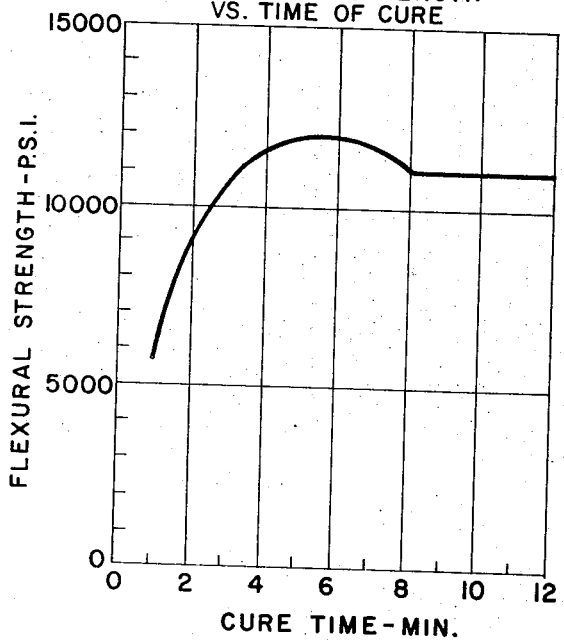
FIG. 3 shows a curve plotted for flexural strength versus time of cure, the values being determined on samples prepared as in Example II and cured for different periods of time.
Figure 4:
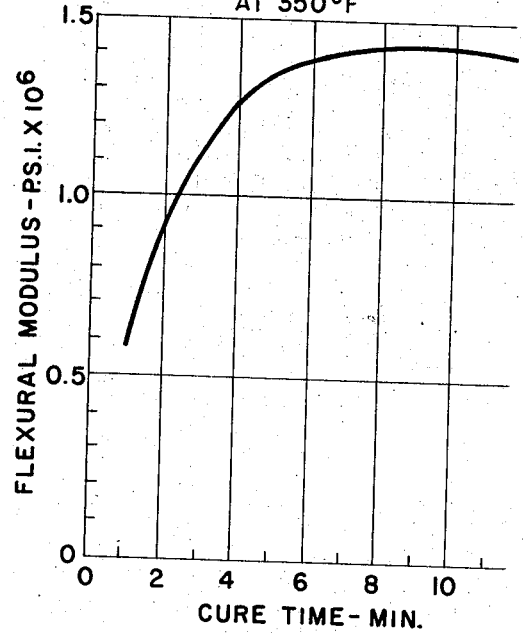
FIG. 4 shows a curve plotted according to determinations of value of flexural modulus (p.s.i.×$10^6$) against time of cure for a resin prepared and cured as in Example II.
Figure 5:
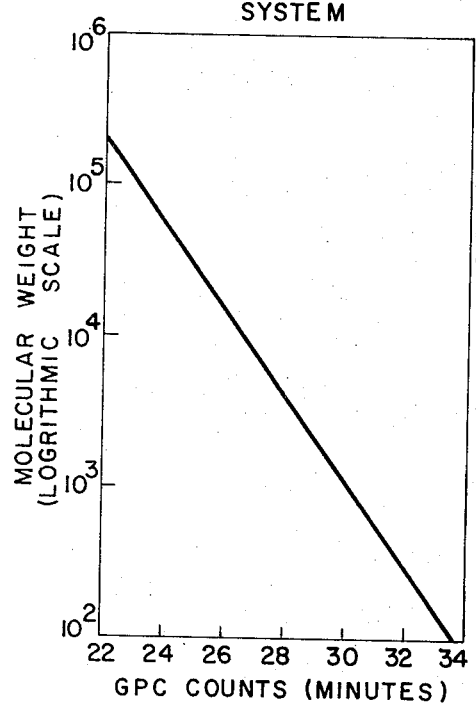
FIG. 5 represents a typical calibration chart for a system of columns used in gel permeation chromatography (GPC) measurement of molecular weight distribution of polybutadienes.
Figure 6:
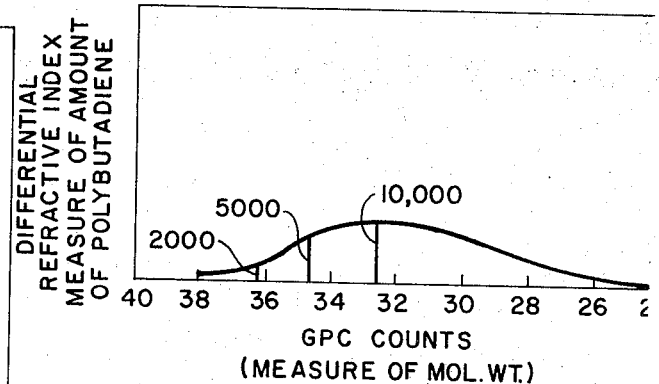
FIGS. 6–11 show curves representing the molecular weight distributions respectively of a number of samples of polybutadiene determined by GPC.
Figure 8:
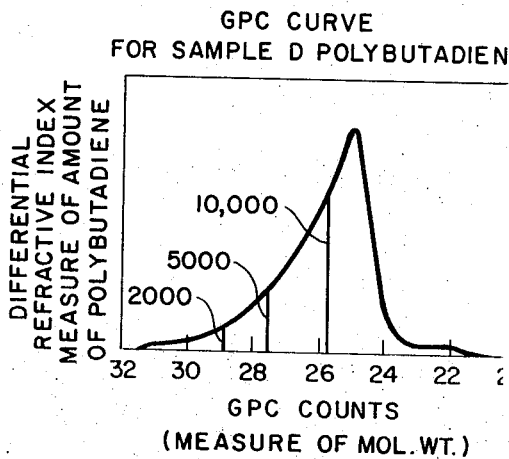
Figure 7:
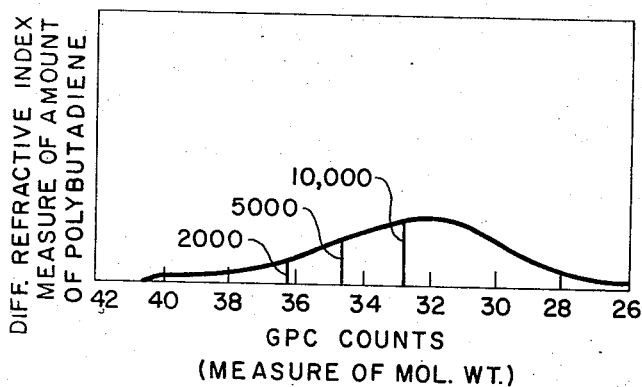
Figure 9:
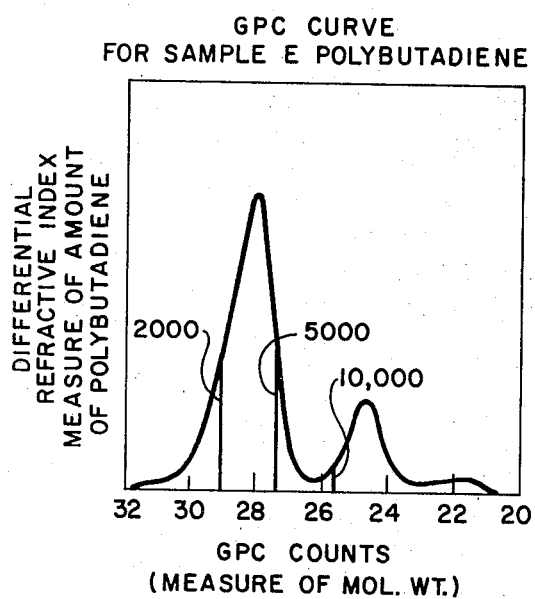
Figure 10:
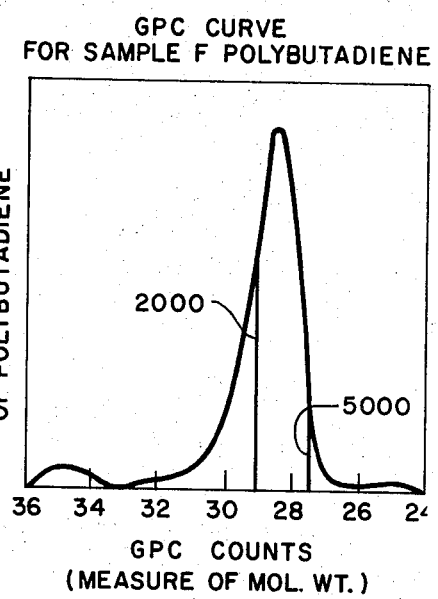
Figure 11:
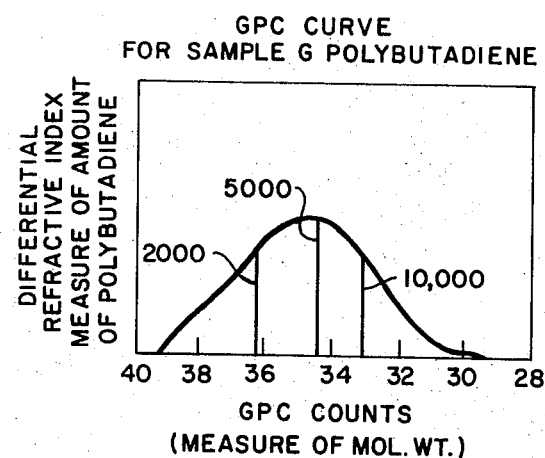

Flow properties which are important with regard to resins suitable for transfer molding, are profoundly affected by molecular weight changes. It is found that polymers of the type defined herein having a DSV of 0.2 to 0.6, preferably 0.25 to 0.4, are particularly suitable for transfer molding using a filler as described herein with no preheat and a molding pressure of 850 p.s.i. and 175° C. The molding pressures are advantageously in the range of 200–2,000 p.s.i. and the molding temperatures in the range of 120° to 200° C. FIG. 2 shows two curves plotted, one at 300° F. and the other at 350° F., for spiral flow tests EMMI–16 made on a polymer used in transfer molding and made in accordance with this invention, in which curves the flow in inches is plotted against the temperature and pounds per square inch for a resin made according to the procedure of Example II. The spiral flow test is performed as described in Society of the Plastics Industry, Inc., Epoxy Molding Material Institute, 250 Park Avenue, New York, N.Y. 10017. A typical procedure for transfer molding is given in Example III.

Example III

A resin prepared according to the procedure of Example II using a polybutadiene having a DSV of 0.30, more than 95% of molecular weight above 10,000, and a vinyl content of 92% is molded in a 50-ton Stokes transfer press using a transfer speed of about 15 seconds, and transfer pressure of 400 pounds, and cure temperature of 350° F. with a cure cycle of two minutes. The resultant moldings have the following properties:

| | |
|---|---|
| Flexural Strength (p.s.i.) | 13,000–14,000 |
| Flexural Modulus (p.s.i.) | 1.3–1.475×10$^6$ |
| Tensile Strength (p.s.i.) | 6500–8100 |
| Tensile Modulus (p.s.i.) | 0.55–0.7×10$^5$ |
| Compressive Strength (p.s.i.) | 20,000–25,000 |
| Compressive Modulus (p.s.i.) | 0.45–0.5×10$^5$ |
| Rockwell E Hardness | 70–80 |

Injection molding resin compositions

Resin compositions suitable for injection molding in accordance with the practice of this invention advantageously employ a butadiene polymer of the type described herein having a DSV of 0.3–0.7. With values below 0.3 the low viscosity creates problems of flowback since cure rate can be controlled in the practice of this invention by proper selection of molecular weight, the percent of vinyl repeating units and the amount of peroxy compound.

Flowability is fundamental to injection molding and essentially a function of molecular weight for a particular polymer. For thermosetting resins, however, the desire to operate at the fastest possible cycle finds flowability threatened and sometimes actually controlled by the onset of cure. Rate of cure can be controlled over a wide range by adjusting either the vinyl repeating unit concentration or the peroxy compound level. Since the problem of "gassing" is encountered with especially high concentrations of peroxy compound, it is often desirable to maintain short cure cycles by the use of higher contents of vinyl repeating units. A typcal procedure for injection molding is described in Example IV.

Example IV

A 75-ton New Britain reciprocating screw machine is used for the injection molding of a resin similar to that used in the transfer molding of Example III with a "stuffer" used to force-feed the putty-like resin into the screw of the machine. A barrel temperature of approximately 170° F. is used with injection times varied from two to 15 seconds, cycle times varied from as low as five seconds to two minutes at mold temperatures from 350° F. to 320° F. A "typical" cycle is 20 seconds at 330° F. mold temperature. Excellent results are obtained with the injection molding.

Similar results are obtained when other polymers are used having various DSV of 0.3 through 0.7, with over 90% above 10,000 molecular weight in each case.

Laminating resin compositions

The resins produced according to the process of this invention are particularly suitable for use in laminates with virtually any type of base-reinforcing material such as glass fiber fabric or mat, burlap, linen, cotton, nylon, polyester, graphite, boron, asbestos fiber, paper and the like. Particulate fillers such as silica, alumina and metal powders can also be incorporated into the resin with good strength retention and interesting decorative effects.

Superior electrical properties, high hardness, excellent chemical resistance and thermal stability, very low water absorption and high heat distortion (above 500° F.) are obtained. Very good flexural strength and modulus are also obtained. The resultant low density, coupled with high tolerance for fillers gives particular economic advantages.

The preferred procedure in preparing laminates is to pre-impregnate the reinforcing fabric, mat or paper with the resin. Glass fiber mat or fabric is particularly suitable. Advantageously the glass mat or fabric is treated with a commercial silane-type finish for optimum adhesion.

The resin is advantageously applied to the reinforcing material in the form of a hexane solution. The viscosity and solids content of the solution is easily adjusted by adding more hexane or one of a variety of compatible solvents. The resin may also be extended with a peroxide-curable monomer such as styrene, vinyl toluene, methyl methacrylate and the like, and such monomers may also be used to replace a part or all of the solvent. High boiling tertiary-butyl styrene has been found particularly advantageous where high temperature, low pressure cures are to be used. Monomer-extended systems can be "set" at room temperature and then formed and post-cured in a second step, if desired. Example V is a typical procedure for laminating with resins of this invention.

Example V

A 181-weave glass cloth (with Hess-Goldsmith 565 finish) is impregnated by immersion in a hexane solution of the resin produced in Example II, which solution has a resin solids content of 20%, a resin gel time of 22 seconds and a resin viscosity of 100 cps. at 25° C. On removal from the impregnating bath, the fabric is passed through squeeze rolls to remove excess liquid. The wet pre-preg is allowed to air dry for one hour at room temperature followed by ten minutes at 100° C. in a circulating air oven. Twelve pieces, corresponding in size to a positive pressure mold, are cut and stacked to form a 12-ply sandwich with alternate pieces in a face-to-face and back-to-back position, all with the warp in the same direction. The sandwich is then placed in the positive pressure mold and cured at 350° F. for three minutes at 200 p.s.i. A number of laminates are made according to this procedure and have the following typical properties:

Density _____ 1.8–1.90
Hardness Barcol _____ 58–60
Flexural Strength (p.s.i.) _____ 65,000–75,000
Izod Impact (notched) _____ft. lbs__ 20–22
Resin Content _____percent__ 21–23
Water Absorption (24 hrs. at 25° C.) _____do____ 0.1
Color Change _____ None
Strength Retention at 500° F. _____percent__ 65
Strength Retention after 16 hrs. @ 500° F. ___do____ 65

Example VI

The procedure of Example V is repeated except that the "squeeze-out" step of Example V is omitted and heavy fiberglass mat sheets are used. In this case the typical properties are as given below:

Density _____ 1.75–1.80
Hardness Barcol _____ 50–55
Flexural Strength (p.s.i.) _____ 28,000–30,000
Flexural Modulus (p.s.i.) _____ 1.6–2.0×10⁶
Izod Impact (notched) _____ft. lbs__ 16–20
Resin Content _____percent__ 27–33
Strength Retention @ 500° F. _____do____ 70
Strength Retention after 16 hrs. @ 500° F. __do____ 70

Example VII

The procedure of Example II is repeated a number of times using individually in place of the dicumyl peroxide an equivalent weight respectively of:

Ditertiary butyl peroxide;
Ditertiary amyl peroxide;
Bis(1,1-diphenyl-ethyl) peroxide; and
Bis(1,1-dicyclohexyl-ethyl) peroxide.

In each case similar improvements in cure rate are noted together with excellent physical properties in the molded product.

Example VIII

The procedure of Example II is repeated a number of times using individually in place of the polybutadiene of that example the following polymers, each with over 95% over 10,000 molecular weight:

(a) Polybutadiene, Mol. Wt. 40,000, 90% vinyl structure in the butadiene repeating units;
(b) Copolymer of 90% butadiene and 10% styrene—Mol. Wt. 50,000 and 86% of the butadiene content in the vinyl repeating unit structure; and
(c) Copolymer of 80% butadiene, 10% styrene and 10% vinyl naphthalene—Mol. Wt. of 55,000 and 93% of the butadiene is in the vinyl type of repeating unit structure.

In each case similar improvements in cure rate are noted together with excellent physical properties in the molded products.

Example IX

The procedure of Example II is repeated a number of times using individually in place of the silica filler an equal weight respectively of particles of alumina, mica, feldspar, talc, asbestos, polyethylene, carbon black and graphite. Improvements are likewise noted in the cure rate in each case.

Example X

The procedure of Example II is repeated a number of times using in place of the calcium stearate an equal weight individually of zinc stearate, magnesium stearate and calcium laurate with similar results. These are processing aids and are not essential to the reaction.

Likewise when the triacetoxy silane is replaced by equivalent weights respectively of γ-glycidoxypropyltrimethoxysilane and γ-methacryloxypropyltrimethoxysilane, similar results are obtained.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A heat-resistant, chemical-resistant, hard polymer of butadiene selected from the class consisting of butadiene homopolymers and copolymers of 40–95 percent by weight of butadiene and butadiene and styrene containing at least 40 percent by weight of butadiene repeating units and the remainder comprising essentially repeating units of styrene and consisting essentially of linear chains equivalent in the linear portions to a molecular weight of 12,500 to 55,000 with said linear chains being cross-linked to a number of similar linear chains through pendent vinyl groups in the butadiene repeating units, there being at least one crosslink per each two butadiene repeating units in said linear chains and there being less than one double bond per each two butadiene repeating units in said linear chains, the total of said pendent vinyl groups including those through which crosslinking has been effected representing at least 80 percent of the butadiene repeating units in the butadiene polymer, the said linear chain portions having at least 50 percent equivalent to molecular weights over 10,000 and at least 95 percent equivalent molecular weights over 2,000, the crosslinking having been effected by intimate contact with a peroxy compound having the formula $$CH_3C(R)_2O\text{---}OC(R)_2CH_3$$

wherein R represents an aryl or alkyl radical of 1–20 carbon atoms, the amount of said peroxy compound being equivalent to 0.5–6 parts by weight of dicumyl peroxide per 100 parts by weight of polymer.

2. A heat-resistant, chemical-resistant, hard polybutadiene consisting essentially of linear chains equivalent in the linear portions to a molecular weight of 12,500 to 55,000 with said linear chains being crosslinked to a number of similar linear chains through pendent vinyl groups in the butadiene repeating units, there being at least one crosslink per each two butadiene repeating units in said linear chains and there being less than one double bond per each two butadiene repeating units in said linear chains, the total of said pendent vinyl groups including those through which crosslinking has been effected representing at least 80 percent of the butadiene repeating units in the polybutadiene, the said linear chain portions having at least 50 perecnt equivalent to molecular weights over 10,000 and at least 95 percent equivalent to molecular weights over 2,000, the crosslinking having been effected by intimate contact with a peroxy compound having the formula $$CH_3C(R)_2O-OC(R)_2CH_3$$

wherein R represents an aryl or alkyl radical of 1–20 carbon atoms, the amount of said peroxy compound being equivalent to 0.5–6 parts by weight of dicumyl peroxide per 100 parts by weight of polymer.

3. The polybutadiene of Claim 2 in which said peroxy compound is dicumyl peroxide.

4. The polybutadiene of Claim 2 in which the total of said pendent vinyl groups represents at least 90 percent of the polybutadiene repeating units in the polybutadiene.

5. The polybutadiene of Claim 4 in which said peroxy compound is dicumyl peroxide.

6. The polybutadiene of Claim 2 in which the said linear portions in said polybutadiene have at least 90 percent thereof equivalent to molecular weights over 10,000.

7. The polybutadiene of Claim 6 in which the total of said pendent vinyl groups represent at least 90 percent of the polybutadiene repeating units in the polybutadiene.

8. The polybutadiene of Claim 7 in which said peroxy compound is dicumyl peroxide.

9. A hard resinous product of Claim 2 in which product the crosslink density is such as to give a reciprocal swelling of at least 4, the reciprocal swelling being calculated by dividing the weight of polymer product by the weight of absorbed toluene when the said sample of said polymer is immersed in toluene at a temperature of 80° C. for a period of at least 16 hours.

10. The product of Claim 9 in which at least 50 percent of the total unsaturation in the polymer in the polymerization compound is consumed as the result of the heating.

11. The product of Claim 10 in which at least 70 percent of said unsaturation has been consumed by said heating.

12. The polybutadiene of Claim 2 in which there is an average of less than one double bond per 1.5 said butadiene repeating units.

13. A hard, fiber-reinforced product of Claim 9 which also contains 25–65 volume percent of a fiber material selected from the class consisting of glass, burlap, linen, cellulose, nylon, polyester, graphite, boron and asbestos.

14. The fiber-reinforced product of Claim 13 in which said fiber is glass.

15. The process of preparing a hard, fast-curing resin of improved heat and chemical resistance, including swelling resistance to toluene, comprising the steps of preparing a substantially uniform mixture of:

(a) 100 parts by weight of butadiene polymer having an intrinsic viscosity average molecular weight of 12,500 to 55,000, at least 50 percent by weight of the polymer having a molecular weight of at least 10,000 and at least 95 percent by weight of the polymer having a molecular weight of at least 2,000, the molecular weight distribution being determined by gel permeation chromatography and at least 80 percent of the butadiene repeating units therein being of the pendent-vinyl structure; and (b) a peroxy compound decomposable in the temperature range being used and having a structure represented by the formula $$CH_3C(R)_2O-OC(R)_2CH_3$$

wherein R represents an aryl or alkyl radical of 1–20 carbon atoms, the amount of said peroxy compound being equivalent to 0.5–6 parts by weight of dicumyl peroxide;

and heating said mixture at a temperature of 250° F. to 420° F. for a period of at least 20 seconds, said butadiene polymer comprising at least 40 percent by weight of butadiene repeating units and the remainder of said polymer comprising essentially repeating units of an alkenyl aromatic comonomer having no more than 20 carbon atoms therein selected from the class of vinyl- and isopropenyl-benzene, naphthalene and diphenyl and nuclear-substituted derivatives thereof in which the derivative groups are selected from the class consisting of alkyl, aralkyl, cycloalkyl and chloro-radicals.

16. The process of Claim 15 in which at least 90 percent by weight of said polymer has a molecular weight of at least 10,000.

17. The process of Claim 15 in which said mixture is heated in the form of a film of no more than 1/32" thickness.

18. The process of Claim 15 in which said polymer and said peroxy compound are intimately mixed with a filler material substantially inert to said polymer and said peroxy compound in a proportion such that the filler is 25–65 volume percent of the resultant mixture.

19. The process of Claim 18 in which said butadiene polymer has a dilute solution viscosity of 0.2–0.7.

20. The process of Claim 18 in which said butadiene polymer is polybutadiene.

21. The process of Claim 18 in which said temperature is in the range of 300°–350° F.

22. The process of Claim 18 in which said peroxy compound is dicumyl peroxide.

23. The process of Claim 22 in which said butadiene polymer is a polybutadiene having at least 90 percent by weight of the vinyl repeating unit structure in the polymer molecule thereof.

24. The process of Claim 18 in which said filler is a finely divided silica.

25. The process of Claim 18 in which said filler is a glass fiber.

26. The process of Claim 18 in which said filler is a finely divided material selected from the class consisting of silica, alumina, mica, feldspar, talc, asbestos, clay, powdered metal, glass fiber, carbon black and graphite.

27. The process of Claim 18 in which the butadiene polymer is a styrene-butadiene copolymer having 5 to 60 percent by weight of styrene and 40 to 95 percent by weight of butadiene therein.

28. The process of Claim 15 in which the butadiene polymer is a butadiene copolymer having 40–95 percent by weight of butadiene and 5–60 percent by weight of styrene.

29. A polymerizable composition comprising (a) 100 parts by weight of a butadiene polymer having an intrinsic viscosity average molecular weight of 12,500 to 55,000 with at least 50 percent by weight of the polymer having a molecular weight of at least 10,000 and at least 95 percent by weight of the polymer having a molecular weight of at least 2,000, and at least 80 percent of the butadiene repeating units therein being of the pendent vinyl structure, and (b) a peroxy compound having the formula $$CH_3C(R)_2O-OC(R)_2CH_3$$

wherein R represents an aryl or alkyl radical having 1–20 carbon atoms therein, the amount of said peroxy compound being equivalent to 0.5–6 parts by weight of dicumyl peroxide, said butadiene polymer comprising at least 40 percent by weight of butadiene repeating units and the remainder of said polymer comprising essentially repeating units of an alkenyl aromatic comonomer having no more than 20 carbon atoms therein selected from the class of vinyl- and isopropenyl-benzene, naphthalene and diphenyl and nuclear-substituted derivatives thereof in which the derivative groups are selected from the class consisting of alkyl, aralkyl, cycloalkyl and chloro-radicals.

30. The polymerizable composition of Claim 29 in which at least 90 percent by weight of said polymer has a molecular weight of at least 10,000.

31. The polymerizable composition of Claim 29 which also contains 25–65 volume percent of a filler material substantially inert to said peroxy compound and to said butadiene polymer, said composition having a cure time of no more than 4 minutes at a temperature of at least 250° F.

32. The composition of Claim 29 in which said peroxy compound is dicumyl peroxide.

33. The composition of Claim 29 in which said butadiene polymer is polybutadiene.

34. The composition of Claim 33 in which said polymer has a vinyl repeating unit structure of at least 90 percent by weight of the polymer molecule.

35. The process of Claim 18 in which said substantially uniform mixture is liquid compounded, and the solvent used in said liquid compounding comprises up to 40 percent by weight of the total mixture, at least part of said solvent comprising a polymerizable monomer selected from the class consisting of styrene, vinyl toluene, methyl methacrylate and t-butyl styrene.

36. The process of Claim 25 in which said solvent is essentially all said polymerizable monomer.

37. The process of Claim 36 in which said polymerizable monomer is styrene.

38. The process of Claim 37 in which said polymerizable monomer is t-butyl styrene.

39. The polymerizable composition of Claim 29 which also contains 25–65 volume percent of a filler material, based on combined volume of filler and polymer, substantially inert to said peroxy compound and to said butadiene polymer and up to 40 percent by weight, based on the total weight of said composition, of a polymerizable monomer selected from the class consisting of styrene, vinyl toluene, methyl methacrylate and t-butyl styrene.

40. The composition of Claim 39 in which said monomer is styrene.

41. The composition of Claim 39 in which said monomer is t-butyl styrene.

References Cited

UNITED STATES PATENTS 3,083,175   3/1963   Safford et al. _____ 260—41.5 R
3,105,828   10/1963  Porter _____ 260—83.7

ALLAN LIEBERMAN, Primary Examiner

H. H. FLETCHER, Assistant Examiner

U.S. Cl. X.R.

260—17.4 CL, 41.5 A, 41.5 R, 83.7, 94.2 M, 94.7 A, 857 D, 873